United States Patent
Morris

(10) Patent No.: US 7,505,528 B2
(45) Date of Patent: Mar. 17, 2009

(54) METHOD AND APPARATUS FOR RANGE EXTENSION OF LOW-POWER WIRELESS COMMUNICATION LINKS

(75) Inventor: Martin Morris, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1628 days.

(21) Appl. No.: 09/945,200

(22) Filed: Aug. 30, 2001

(65) Prior Publication Data

US 2003/0043930 A1   Mar. 6, 2003

(51) Int. Cl.
H04B 15/00 (2006.01)
(52) U.S. Cl. .................................. 375/285
(58) Field of Classification Search ............. 375/259, 375/285, 219, 220, 316, 346
See application file for complete search history.

(56) References Cited

U.S. PATENT DOCUMENTS

| | | | | |
|---|---|---|---|---|
| 5,583,851 A | * | 12/1996 | Kato et al. | 370/342 |
| 6,269,086 B1 | * | 7/2001 | Magana et al. | 370/280 |
| 2002/0034172 A1 | * | 3/2002 | Ho | 370/338 |
| 2002/0187799 A1 | * | 12/2002 | Haartsen | 455/509 |

OTHER PUBLICATIONS

Specification of the Bluetooth System, The ad hoc SCATTERNET for affordable and highly functional wireless connectivity, v 0.8, Jan. 22, 1999, pp. 1-592.

* cited by examiner

Primary Examiner—Kevin M Burd
(74) Attorney, Agent, or Firm—McAndrews, Held & Malloy, Ltd.

(57) ABSTRACT

A method and system for improving a level of service between wireless devices. Handheld devices implementing the Bluetooth specification typically have relatively limited transmission ranges. As a result, and since they are typically portable, such devices easily experience abrupt communication interruptions, either between themselves and other handheld devices, or between themselves and fixed devices. The effective range of the devices can be extended by providing additional error-correcting coding. Although this modification also results in an extended transmission time, users are provided with an increased transmission range, and are given warning that service may soon be interrupted. Users may then, if they wish, take such steps as finishing their communication or moving into their devices' normal transmission range. Additionally, the handheld devices may use the extra transmission time and range to search for a forwarding path to a recipient device, thus minimizing or preventing any service interruption.

29 Claims, 5 Drawing Sheets

METHOD AND APPARATUS FOR RANGE EXTENSION OF LOW-POWER WIRELESS COMMUNICATION LINKS

BACKGROUND OF THE INVENTION

1. Field of the Invention

The present invention relates to wireless devices, and more particularly to methods for improving transmission services between such devices.

2. Description of the Related Art

As the number and type of electronic devices have proliferated, so have the number and type of connectors and protocols for communicating between the electronic devices. For example, televisions, personal computers (and associated peripheral devices), personal digital assistants (PDAs) and mobile telephones all typically require different methods for communicating with other electronic devices. As a result, a given electronic device must either embrace multiple communication techniques (e.g., a personal computer may support different protocols for different peripheral devices, and may have one or more serial, parallel and infrared I/O ports), or do without the ability to communicate with a particular device. Moreover, even if an electronic device has the ability to support a plurality of communication techniques, the corresponding increase in associated processing power and the number of cables/connectors to provide such support can prove cumbersome or prohibitive.

The Bluetooth standard protocol was developed with the above in mind, and provides a single protocol for wireless communications between a plurality of different types of electronic devices. As such, this protocol overcomes many or all of the problems described above. Bluetooth is described in more detail in, for example, *Specification of the Bluetooth System*, v0.8, Jan. 22, 1999 (and in subsequent revisions thereof), which is hereby incorporated herein by reference and may hereinafter be referred to as the "Bluetooth specification."

In addition to overcoming the above-discussed problems, Bluetooth also permits the grouping of physically proximate wireless devices into local networks known as "piconets." Such piconets may operate in a "peer-to-peer" manner (each communicating directly with one another), or may utilize a "master-slave" relationship, in which one device serves as a central point for the network, through which each of the other network devices communicate.

The Bluetooth specification provides for devices in different power classes. For example, low power (class 3) devices have a maximum power output of 1 mW, representing a typical transmission range of 10 meters, while high power (class 1) devices may produce up to 100 mW output, for an approximate transmission range of 100 meters. The protocol for communication between all devices is uniform, so that class 1 and class 3 devices may exchange data, assuming they are in range of one another.

For cost and power consumption (battery life) considerations, most handheld/portable devices implementing Bluetooth are class 3 devices. This means that even if one of these devices is plugged into a wall outlet to save battery power, its transmission range typically will not extend beyond approximately 10 meters. In contrast, most fixed devices implementing Bluetooth are conventionally class 1 devices.

Given the portability of such a handheld device, it may easily be moved beyond its effective transmission range for communicating with other devices. For example, the handheld device may be moved to a position where it can still detect transmissions from a fixed device, but the fixed device will not be able to detect the handheld device's replies. Similarly, one handheld device may be moved out of its effective transmission/reception range with respect to a second handheld device. Such movements can result in abrupt transmission interruptions (or stoppages) between the devices. Moreover, to the extent that a handheld device is part of a piconet, the device may experience such interruptions/stoppages despite the fact that another device within the piconet (or possibly even outside of the piconet) is within range and capable of forwarding transmissions to and from the device.

Although the transmission range of the device could be extended by increasing its power (or some other common method), such alterations would be problematic for reasons such as cost, battery limitations and increased interference between devices.

SUMMARY OF THE INVENTION

The present invention relates to a system and method for effectively increasing the transmission range of a device implementing a short-range wireless communication protocol, such as the Bluetooth specification, without significantly increasing the device's cost, power, or interference with other devices. The present invention avoids abrupt interruptions and/or stoppages of communication experienced by the device, and allows for soft hand-off between devices when feasible. In so doing, the present invention contemplates a wireless device for communicating with other devices, either in a one-to-one transmission, or in the context of a system or piconet of communication devices. Such a wireless communications device might include a receiver operable to receive digitally-encoded data, a transmitter operable to transmit digitally-encoded data over a transmission range, and an error-correcting coding mechanism that alters a level of error-correcting coding of transmitted signals when necessary to increase the effective transmission range of the wireless communications device.

Devices utilizing the present invention operate normally as long as they are in range of one another. When one device detects that it is moving out of range of a second device (or vice versa), it begins applying additional error-correcting coding to sent messages. This additional coding allows for a reduction in the bit error rate of the messages, thus increasing the message's signal-to-noise ratio and allowing the message to be decoded at a greater distance from the sending device. A secondary result is that the effective transmission rate of the message is lowered.

The sending device also reserves an access code portion at the beginning of each message burst to notify the other device that the attached message burst is being sent at a lower effective transmission rate than is normal for the Bluetooth specification. This permits the receiving device additional time to perform more robust decoding of the message. Of course, as a consequence, the user will experience some delay in receiving such messages. However, the user will at least be aware that a maximum transmission range is near, and the additional time can be used to complete a message, to move back within a standard transmission range, or to perform a soft-handoff of the receiving device (to thereby continue receiving the message via an intermediary device).

BRIEF DESCRIPTION OF THE DRAWINGS

The present invention is described with reference to the accompanying drawings. In the drawings, like reference numbers indicate identical or functionally similar elements.

Additionally, the left-most digit(s) of a reference number identifies the drawing in which the reference number first appears.

DETAILED DESCRIPTION

While the present invention is described below with respect to various explanatory embodiments, various features of the present invention may be extended to other applications as would be apparent. In particular, it should be understood that this invention is not limited to networks compliant with the Bluetooth specification, and could be similarly implemented using other types of wireless networks.

Figure 1A:
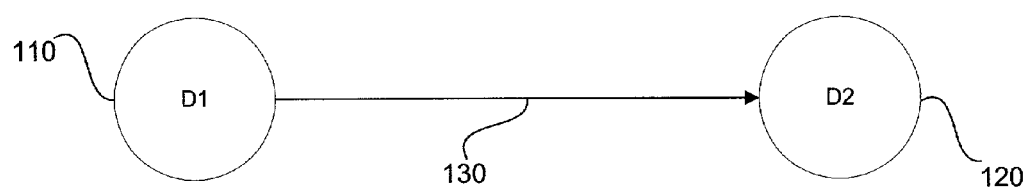
FIG. 1A demonstrates two wireless devices that are within transmission range of one another.

FIG. 1A demonstrates wireless devices 110 and 120. Device 110 is a class 3 Bluetooth device having an effective transmission range of up to 10 meters, as demonstrated by solid arrow 130. Device 120 represents either a class 1 Bluetooth device (having a transmission range of up to 100 meters) or a second class 3 Bluetooth device.

Figure 1B:
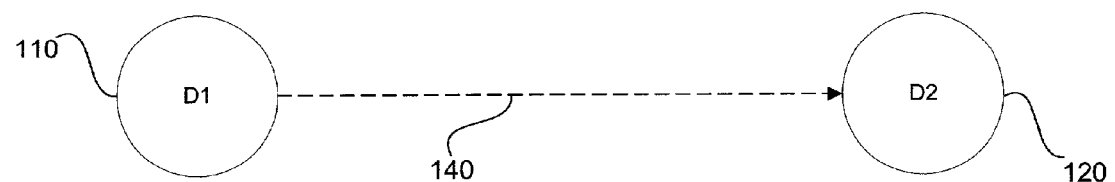
FIG. 1B demonstrates two wireless devices that would not ordinarily be within transmission range of one another, but are within an extended transmission range according to one embodiment of the present invention.

Regardless of whether device 120 is class 1 or class 3, device 110 would not normally be capable of transmitting data to device 120 if device 120 is located at an effective transmission range greater than range 130, represented by dashed arrow 140 of FIG. 1B (of course, as referred to above, if device 120 is a class 1 device, it would remain capable of transmitting to device 110). However, the present invention allows device 110 to continue to transmit to device 120 over an increased effective transmission range 140.

Figure 2:
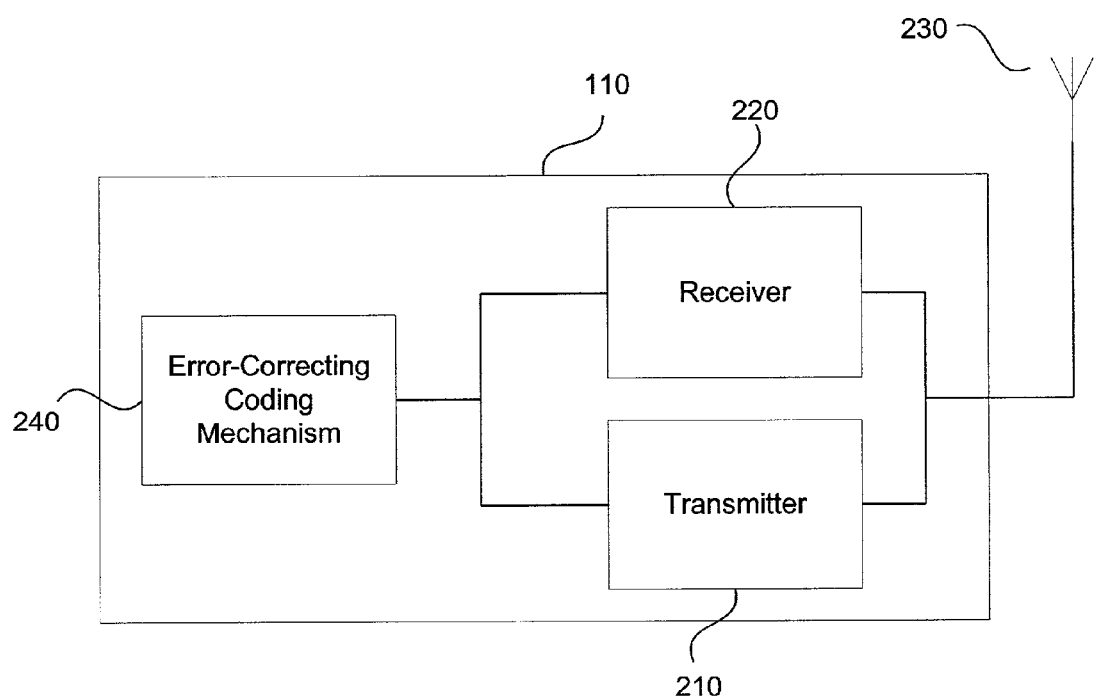
FIG. 2 demonstrates a block diagram of a wireless communications device according to one embodiment of the invention.

FIG. 2 demonstrates a block diagram of wireless communications device 110 just discussed. In FIG. 2, device 110 includes a transmitter 210 and receiver 220, which transmit and receive data via antenna 230. Operating in conjunction with transmitter 210 and receiver 220 is error-correcting coding mechanism 240, which is operable to increase a level of error-correcting coding applied to data sent by transmitter 210, such that transmission range 130 in FIG. 1 is effectively increased to transmission range 140. The theory underlying the operation of error-correcting coding mechanism 240 is discussed in more detail below.

Bluetooth is a standard for digital transmission, and, as with most digital transmissions, it relies on error-correcting coding to transmit and receive signals at a certain speed and level of reliability. Error-correcting coding (ECC) essentially deals with the situation where a "1" is mistaken for a "0" (or vice-versa) in a digital transmission. Such errors can occur, due to, for example, electronic noise, component defect, etc. ECC uses various coding techniques to identify and correct these errors.

ECC relies on the inclusion of redundant information (bits) in a signal, which contains information about the data that can be used to correct the above-mentioned difficulties. In general, the more ECC bits that are included with the data in a given transmission, the more errors can be tolerated in that transmission. However, ECC requires processing beyond what would otherwise be required; therefore, a message transmitted using ECC will either require more processing power and/or additional transmission time.

As a given signal transmits over a certain distance, its bit error rate also increases. Hence, based on the above, the present invention seeks to increase an effective transmission range of a device by increasing a level of error-correcting coding applied to a signal that is transmitted by that device. In other words, since the effect of increased distance is a lower signal-to-noise ratio that manifests as an increased bit error rate, additional coding allows the same signal to be correctly decoded at a greater range.

Bluetooth typically utilizes an access code at the start of each message burst. Such an access code can serve multiple purposes. For example, a channel access code usually provides identification of devices in a piconet, including which member is the master (which could be either the device itself, or the destination device if the transmitting device is a slave). A device access code may identify special procedures or functions of a device; e.g., paging, etc. An inquiry access code is generally used to determine which (if any) additional Bluetooth devices are in range.

Inquiry access codes can generally be divided into two types: general and dedicated. General inquiry access codes are used to determine whether any Bluetooth device is within transmission range. Dedicated inquiry access codes (DIACs) are used to determine whether any Bluetooth device sharing a common characteristic is within transmission range. For example, a DIAC can be used to discover all Bluetooth devices within range that are dedicated to a particular piconet. According to the Bluetooth specification, DIACs are specially chosen to tolerate a higher bit error rate than a body of a message, such that they can be detected beyond a range at which a Bluetooth transmission would normally be corrupted. This is so that they can achieve their function of being detected by a receiver even before a clock synchronization is achieved between the transmitting and receiving devices.

Figure 3A:
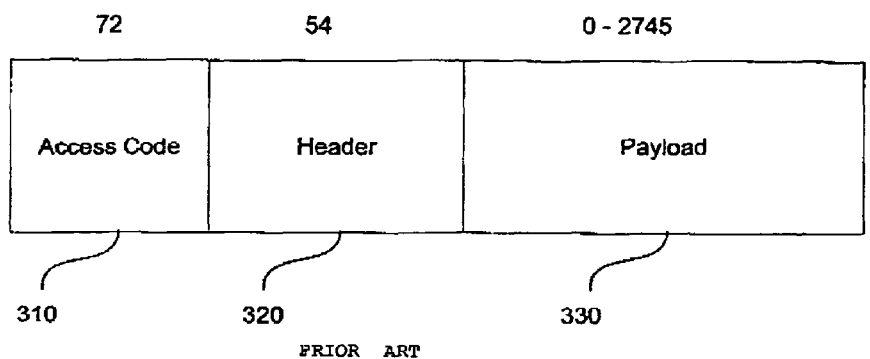
FIG. 3A demonstrates a conventional Bluetooth transmission packet.

FIG. 3A demonstrates a conventional transmission format, which is used by the invention except as discussed below. In FIG. 3A, 72 bits within section 310 of the transmission format are reserved for one or more of the access codes discussed above. The 54 bits in the section 320 are used as a header for identifying the type of device/content, etc., as is conventional, and the remaining 2745 bits in section 330 are used for the payload of the transmission.

According to one embodiment of the present invention, a device 110 that desires to transmit first attempts to communicate in the normal fashion; i.e., transmitter 210 sends out a burst having the above format. If receiver 220 of device 110 is able to hear a recipient device, but the other device does not respond (or if receiver 220 receives nothing in response), error-correcting coding mechanism 240 then tries re-coding the message into a low-rate packet or packets which are transmitted by transmitter 210 under a specially reserved DIAC. That is, the entire packet, including the original access code and header, are re-coded and prefixed with the reserved DIAC.

On the receiving side, when a device equipped with this invention hears one of the reserved DIACs, it begins decoding the remainder of the burst (note that, as discussed above, DIACs are more robust than a typical Bluetooth data packet, and may thus be received by the receiving device even at a distance where the first, initially-sent data packet is unrecoverable). The first subsequent part of the burst will be the original access code. The receiving device looks at the original access code to determine if it should continue processing the burst or discard it. Since each bit of the balance of the burst is extended, it may be oversampled and a majority vote used to decide on the bit value. As is typical, error checks can detect and discard damaged bursts.

Figure 3B:
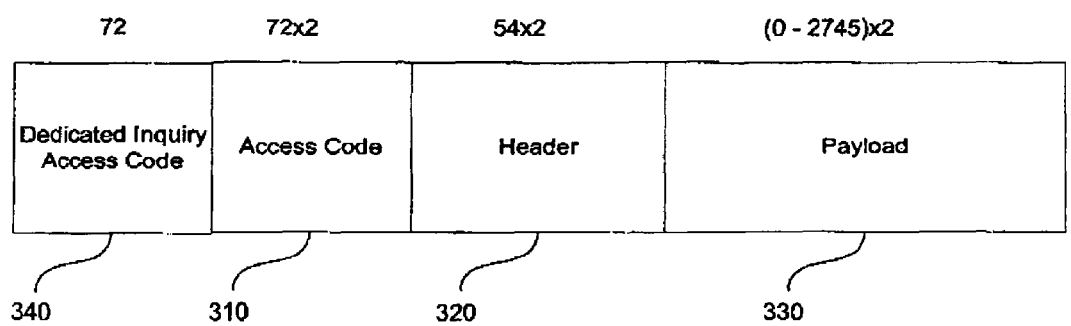
FIG. 3B demonstrates an exemplary transmission format used by one embodiment of the invention to increase a device's effective transmission range.

FIG. 3B demonstrates a transmission format used to implement this embodiment of the invention. In FIG. 3B, access code 310, header portion 320 and payload portion 330 remain the same. However, DIAC 340 is now appended as a burst preamble that serves as a warning that the burst to follow is at a lower effective rate than normal Bluetooth bursts. The remainder of the burst after the DIAC can then be transmitted with the same modulation as usual, but with each bit time extended by a factor determined by the choice of DIAC. Thus, in FIG. 3B, although the length of the DIAC is 72 as is standard for a DIAC, the remaining portions are multiplied by the exemplary 2×extension factor. As mentioned above, this bit time extension allows for increased ECC, which in turn increases the signal-to-noise ratio of the signal and allows reception of the signal at a distance beyond the nominal maximum range of the transmitting device.

For example, a DIAC might be reserved to signify a 2×extension of the bit time, reducing the effective data rate to one half. Another DIAC might call for a 3×extension, or an extension of only 50% (1.5×). The receiver, based on the DIAC preamble, can then take advantage of the extended bit times to perform a more robust decode of the payload of the burst. Of course, as alluded to above, such a process requires additional time, increasing the time necessary to receive the payload portion 330 in proportion to the selected bit time extension. If the bit extension causes the packet to exceed the maximum length (in time) of the Bluetooth packet, it will be necessary to insert additional packets or change the packet type to use more slots. Nevertheless, despite the increased time required to decode the payload, the present invention is advantageous in that it provides a user with additional transmission range and time, thereby allowing the user the opportunity to, for example, end the transmission or move back to within a standard transmission range.

Since the modified DIAC is compliant with the Bluetooth specification, devices which are not equipped with the present invention will simply ignore the DIACs which are used, the same as any burst not addressed to it. Even if an unequipped device were to attempt to decode the entire burst, error checks will fail due to the extended bit times (which will appear to the receiver 220 as bit replications).

Thus, the present invention is not mandatory for any device implementing the Bluetooth specification. However, if a class 1 device and a class 3 device both implement this extension, then communication at a reduced data rate can be provided without interfering with simultaneous communication with standard devices.

The present invention can be used in a variety of advantageous ways. For example, the invention will obviously allow messaging at a range beyond that of a normal Bluetooth device. In addition, if a device is moving from the normal transmission range through the extended transmission range of the present invention, a user can be warned that loss of service is imminent. For example, the user's device may exhibit an indicator light whenever the user/device is located within the extended transmission range. The fact that a device is moving out of range can be detected by, for example, measuring a received signal strength indicator (RSSI) from the device. Alternatively, or additionally, a transmitting device may detect an increased bit error rate as a means for determining impending loss of reception. Other methods for determining a position of a mobile Bluetooth device, especially in the context of a plurality of stationary access points overseeing Bluetooth transmissions to and from mobile nodes, are known and/or currently under development. Regardless of how position information is determined, the user may use the information to decide to remain within transmission range. If the user does not remain within transmission range, at least he or she will not generally experience an abrupt stoppage of service without warning. However, even if the user does experience an abrupt loss of transmission, the present invention may advantageously be used to at least attempt recovery of the transmission.

Also, if the device in question is part of a network, stoppage may be avoided entirely, by providing a "soft handoff" for the device that is moving out of range. In the prior art, a portable device that is exchanging information with another device (a fixed device or a second portable device) may sometimes move out of range of the fixed device. Prior art methods provide for the finding by the fixed device of an intermediary device within the same network, by which the two original devices may continue to share data. That is, the intermediary device forwards the data between the two original devices. However, it frequently happens in the prior art that the connection between the two original devices is temporarily lost (and/or abruptly interrupted) during the time that the fixed device searches for an intermediary. The present invention is capable of solving this problem and related problems.

Figure 4:
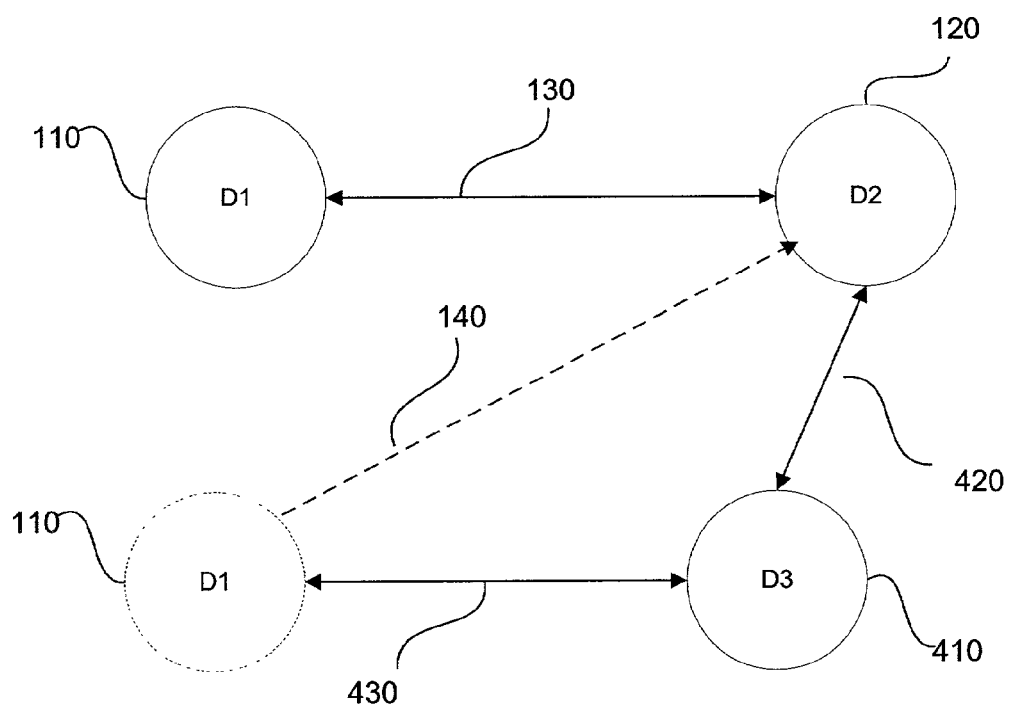
FIG. 4 demonstrates a methodology for a soft hand-off between multiple wireless devices as a first one of the wireless devices moves out of range of a second wireless device.

For example, as shown in FIG. 4, if a device 110 is communicating with device 120, at some point it may notice a drop in signal strength indicating that device 110 is moving out of range to a new location. As just discussed, if the device 110 is participating in an extended network that supports data forwarding, device 120 may begin searching for another device (e.g., device 410) that can forward data to device 110. However, as was also just discussed, by the time it finds one, direct communication may already have been lost, and/or the dropout may occur abruptly.

In these cases, device 120 may attempt to notify device 110 via a low rate burst according to the present invention, so that communication can be continued without interruption or resumed quickly. That is, devices 110 and 120 can continue to communicate via link 140, as discussed with connection to FIGS. 1 and 2 above, until such time as device 120 locates device 310. At that point, messages between devices 110 and 120 may be forwarded using device 410, via links 420 and 430. In this way, a user may experience an easy, transparent and continuous hand-off. It should be noted here that the just-described hand-off process, as with various other processes of the present invention, could also be controlled by a user, either as a default or override process. For example, a user may wish to manually control hand-off when the automatic process is repeatedly bouncing the user to forwarding devices that are not appreciably different from one another in transmission quality.

Figure 5:
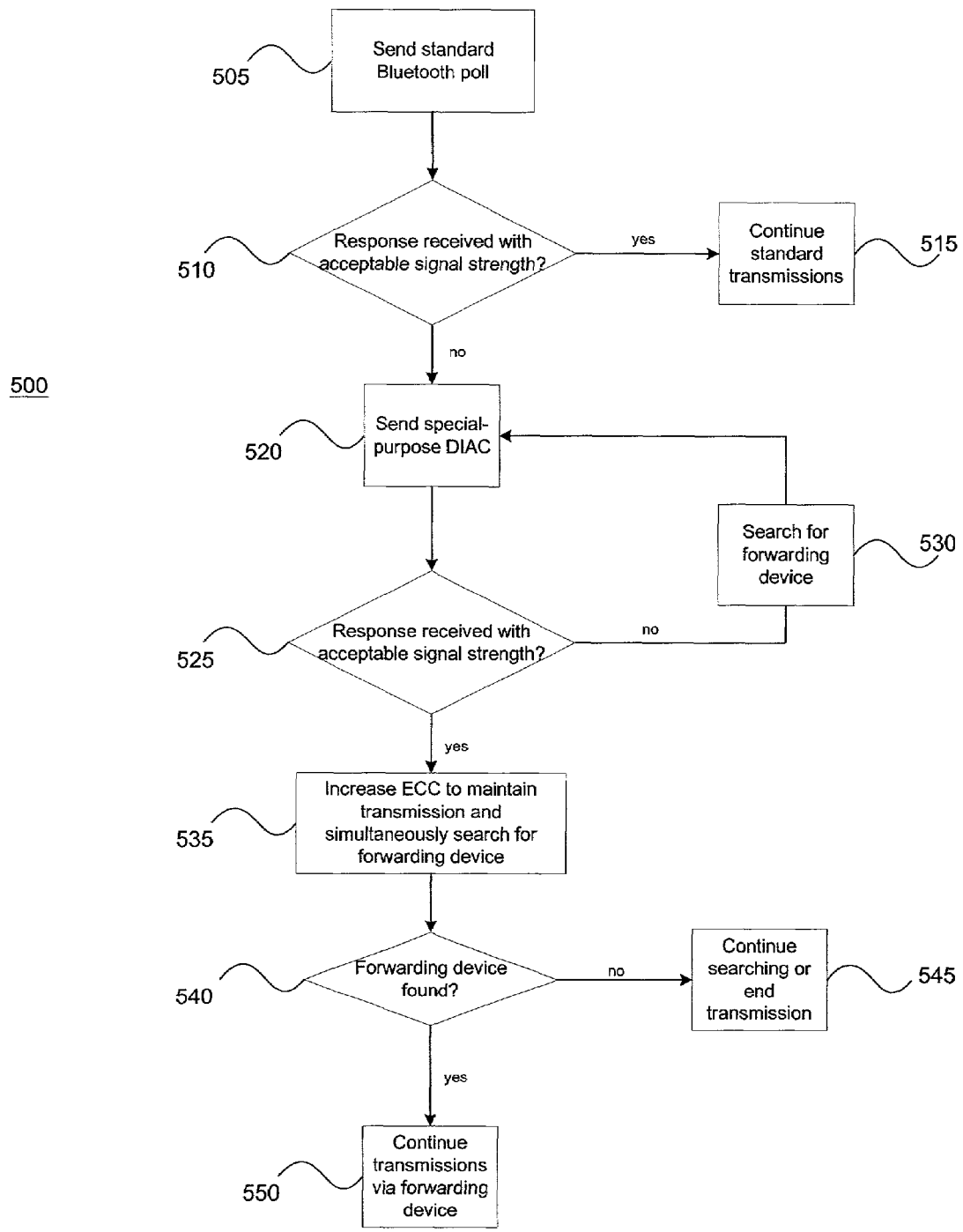
FIG. 5 is a flow chart describing the process for a soft hand-off demonstrated in FIG. 4.

The process just discussed is described in more detail, for a particular embodiment of the invention, with respect to the flowchart 500 shown in FIG. 5. In step 505 of the flowchart, device 110 sends a standard Bluetooth poll for subsequent data transmission(s) to device 120. In step 510, device 110 determines whether a response is received from device 120 with acceptable signal strength. If such a response is received, standard Bluetooth transmissions are continued in step 515. Otherwise, device 110 sends out in step 520 a special-purpose DIAC, as discussed above, to alert device 120 that subsequent data will receive a particular level of increased error-correcting coding.

If device 110 then receives a response in step 525, it may increase ECC in step 535 to maintain transmission, while simultaneously searching for a forwarding device (as discussed with respect to FIG. 4). If an unacceptable response is received in step 525, device 110 may nevertheless continue searching for a forwarding device in step 530 (and may propose gradually-increasing levels of increased ECC to device 120 in step 520 until an appropriate response is received in step 525). Although not demonstrated in FIG. 5, it is possible that device 110 may either move back into standard transmission range with device 120 (in which case normal transmissions may resume), or may move completely out of range of device 120 via any available forwarding device (in which case transmissions must cease). Once an acceptable forwarding device 410 is found in step 540, device 110 can continue normal transmissions via that device. Of course, if no forwarding device is located, searching continues in step 545, until transmissions end after a predetermined time, or until device 110 moves back to within normal operating range of device 120.

In conclusion, the above description has provided various explanatory embodiments to explain a methodology for extending an effective transmission range of a wireless device. The methodology may be implemented in a number of settings; for example, at the outset of a connection between two devices if necessary to establish the connection, at an ending of a connection when the connection has actually been lost, or at a fading of the connection (as detected by a decrease in RSSI or increase in bit error rate) when the connection may be imminently lost. The methodology may also be implemented between different types of devices; e.g., between a class one and a mobile class two device or between two class two devices. Thus, by virtue of the present invention, transmissions can be made more reliable, and abrupt stoppages or interruptions of transmissions can be avoided.

While this invention has been described in various explanatory embodiments, other embodiments and variations can be effected by a person of ordinary skill in the art without departing from the scope of the invention. For example, the invention additionally contemplates applying different error correcting coding techniques instead of merely extending bits in the context of standard Bluetooth error correction.

What is claimed is:

1. A wireless communications device for receiving and sending incoming and outgoing transmissions, said transmissions including digitally-encoded data and error-correcting coding for the digitally-encoded data, comprising:
   a receiver operable to receive the incoming transmissions;
   a transmitter operable to send the outgoing transmissions over a first transmission range; and
   an error-correcting coding mechanism operable to vary a level of the error-correcting coding applied to the digitally-encoded data within the outgoing transmissions, such that the first transmission range is effectively increased up to a maximum transmission range corresponding to a maximum level of error-correcting coding.
   wherein an access code portion of outgoing transmissions sent by the wireless communications device is reserved to notify a second wireless communications device that the outgoing transmissions have an increased level of error-correcting coding.

2. The wireless communications device of claim 1, wherein the error-correcting coding mechanism is additionally operable to decode varying levels of error-correcting coding applied to the incoming transmissions.

3. The wireless communications device of claim 1, wherein a first portion of the outgoing transmissions contains information to notify the second wireless communications device that a remaining portion of the outgoing transmissions have an increased level of error-correcting coding.

4. The wireless communications device of claim 3, wherein a first portion of the incoming transmissions contain information to notify the wireless communications device that a remaining portion of the incoming transmission has an increased level of error-correcting coding.

5. The wireless communications device of claim 1, wherein the error-correcting coding mechanism is activated when the receiver does not receive an anticipated incoming reply transmission from the second wireless communications device.

6. The wireless communications device of claim 1, wherein the wireless communications device and the second wireless communications device implement the Bluetooth specification for transmitting and receiving data.

7. The wireless communications device of claim 1, wherein the reserved access code portion is a reserved dedicated inquiry access code.

8. The wireless communications device of claim 7, wherein the digitally encoded data comprises a digitally-encoded data packet including an access code portion, a header portion and a payload portion.

9. The wireless communications device of claim 8, wherein the error-correcting coding mechanism is activated when the second wireless communications device is outside the first transmission rage, such that the data packet is re-encoded, prefixed with the reserved dedicated inquiry access code and N-sent with a pre-determined increase in error-correcting coding.

10. The wireless communications device of claim 9, wherein the reserved dedicated inquiry access code contains information indicating a level of the pre-determined increase in error-correcting coding.

11. A method far sending a transmission from a wireless device, the method comprising:
    detecting that a recipient device is outside of a transmission range of the wireless device;
    encoding digital data to be transmitted using enhanced error-correcting coding beyond a standard level of error-correcting coding;
    notifying the recipient device that following data will contain enhanced error-correcting coding, said notifying comprising reserving an access code portion of the transmission for the notification of enhanced error-correcting coding; and
    sending the encoded digital data.

12. The method of claim 11, said detecting whether a recipient device is outside of a transmission range of the wireless device further comprising:
    failing to detect a reply transmission from the recipient device.

13. The method of claim 11, said detecting that a recipient device is outside of a transmission range of the wireless device further comprising:
    detecting a drop in signal strength in a reply transmission from the recipient device as the recipient device and the wireless device move relative to one another.

14. The method of claim 11, said encoding data to be transmitted using enhanced error-correcting coding beyond a standard level of error-correcting coding further comprising:
    re-encoding previously-sent data using the enhanced error-correcting coding.

15. The method of claim 11, wherein the access code portion is a dedicated inquiry access code portion.

16. The method of claim 15, said notifying the recipient device that following data will contain enhanced error-correcting coding further comprising:
prefixing the re-encoded previously-sent data with the reserved dedicated inquiry access code portion.

17. The method of claim 11, said detecting that a recipient device is outside of a transmission range of the wireless device further comprising:
searching for a third wireless device that is available to serve as a forwarding device for forwarding the transmission from the wireless device to the recipient wireless device.

18. The method of claim 11, further comprising:
searching for a second device operable to continue receiving communications from the recipient device; and
transferring communications from the recipient device to the second device.

19. An article of manufacture, which comprises a computer readable medium having stored therein a computer program carrying out a method for sending a transmission from a wireless device, the computer program comprising:
a first code segment for encoding, in response to an indication that a recipient device has been detected to be outside of a transmission range of the wireless device, a message using enhanced error-correcting coding beyond a predefined standard level of encoding, to thereby effectively increase the transmission range of the wireless device; and
a second code segment for generating a notification for transmission to the recipient device that the message will contain enhanced error-correcting coding,
wherein the message is a data packet comprising an access code portion, a header portion and a payload portion, and
wherein a dedicated inquiry access code portion is appended to a beginning portion of the access code portion.

20. The article of manufacture of claim 19, wherein the dedicated inquiry access code portion contains the notification generated by the second code segment.

21. The article of manufacture of claim 20, wherein a user of the wireless device is notified of a use of the first and second code segments during their operation.

22. The article of manufacture of claim 19, wherein the wireless device, including the first and second code segments, operate according to the Bluetooth specification.

23. A method for extending a transmission range of a wireless device, the method comprising:
encoding data using a first error correction code when the wireless device is within a first transmission range of a recipient device;
detecting that the wireless device is outside said first transmission range; and
encoding messages using a second error correction code when the wireless device is outside said first transmission range,
wherein a dedicated inquiry access code portion of transmitted data is reserved to identify the recipient device and notify the recipient device of the second error correction code when it is utilized by the wireless device.

24. The method of claim 23, wherein said second error correction code provides greater error correction capacity than said first error correction code.

25. The method of claim 23, wherein the wireless device implements the Bluetooth specification.

26. A wireless communications system, comprising:
a first wireless device having a first transmission range and a first error-correcting coding means; and
a second wireless device having a second transmission range,
wherein, when the first wireless device moves outside of the first transmission range relative to the second wireless device) the first error-correcting coding means increases the first transmission range by increasing the level of error-correcting coding applied to transmissions sent from the first wireless device to the second wireless device,
wherein a dedicated inquiry access code portion of transmitted data is reserved to identify the second wireless device and notify the second wireless device of the second error correction code when it is utilized by the first wireless device.

27. The wireless communications system of claim 26, wherein at least sonic transmissions within the system are sent and received according to the Bluetooth specification.

28. The wireless communications system of claim 27, wherein a user of the first wireless device is notified of the increased level of error-correcting coding, whereby the user may choose to end the transmission using the increased level of error-correcting coding or move back into the first transmission range.

29. The wireless communications system of claim 27, wherein the wireless communications device and the second wireless communications device are part of a wireless network of communications devices, at least some of which are portable, and further wherein the increased effective transmission range is temporarily utilized when the wireless communications device exceeds the first transmission range, in order to maintain contact between the two wireless communications devices until one of the remaining network devices can begin to forward data between the two wireless communication devices.

* * * * *

UNITED STATES PATENT AND TRADEMARK OFFICE
CERTIFICATE OF CORRECTION

PATENT NO.        : 7,505,528 B2                                    Page 1 of 1
APPLICATION NO. : 09/945200
DATED             : March 17, 2009
INVENTOR(S)       : Martin Morris It is certified that error appears in the above-identified patent and that said Letters Patent is hereby corrected as shown below:

Column 8, line 33 delete "N-sent" and insert --re-sent--.

Column 10, line 22 delete "device)" and insert --device,--.

Signed and Sealed this

Twenty-eighth Day of July, 2009

JOHN DOLL
*Acting Director of the United States Patent and Trademark Office*